United States Patent
Porto et al.

(10) Patent No.: US 9,140,359 B2
(45) Date of Patent: Sep. 22, 2015

(54) UPSHIFT CONTROL OF A DRY DUAL-CLUTCH TRANSMISSION

(71) Applicant: GM GLOBAL TECHNOLOGY OPERATIONS LLC, Detroit, MI (US)

(72) Inventors: Brian M. Porto, Novi, MI (US); Matthew D. Whitton, Howell, MI (US); Steven P. Moorman, Dexter, MI (US); Craig J. Hawkins, Howell, MI (US); Roberto Diaz, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 13/906,976

(22) Filed: May 31, 2013

(65) Prior Publication Data

US 2014/0195131 A1 Jul. 10, 2014

Related U.S. Application Data

(60) Provisional application No. 61/749,596, filed on Jan. 7, 2013.

(51) Int. Cl.
*F16H 61/688* (2006.01)
*B60K 17/00* (2006.01)

(52) U.S. Cl.
CPC ............ *F16H 61/688* (2013.01); *B60K 17/00* (2013.01)

(58) Field of Classification Search
CPC ................................ F16H 61/688; B60K 17/00
USPC ............. 701/60, 67, 68; 477/39, 70, 86, 180, 477/259, 261, 262; 192/48.1; 74/330, 340
See application file for complete search history.

(56) References Cited

U.S. PATENT DOCUMENTS

| | | | | |
|---|---|---|---|---|
| 4,947,970 A | * | 8/1990 | Miller et al. | 477/30 |
| 2004/0198552 A1 | * | 10/2004 | Bothe et al. | 477/127 |
| 2009/0156356 A1 | * | 6/2009 | Jiang | 477/86 |
| 2009/0210123 A1 | * | 8/2009 | Baldet et al. | 701/66 |
| 2010/0138121 A1 | * | 6/2010 | Porta et al. | 701/68 |

* cited by examiner

*Primary Examiner* — Fadey Jabr
*Assistant Examiner* — Aaron L. Troost
(74) *Attorney, Agent, or Firm* — Quinn Law Group, PLLC

(57) ABSTRACT

A vehicle includes an engine, a dry dual-clutch transmission (dDCT) having a pair of input clutches and a gearbox containing oddly- and evenly-numbered gear sets, and a transmission control module (TCM). Application of one of input clutches connects the engine to a corresponding one of the oddly- or evenly-numbered gear sets. The TCM includes feed-forward PID-based control logic, and a torque-to-position (TTP) table for each input clutch. The TCM commands a position of a designated input clutch during a power-on upshift using the feed-forward, PID-based control logic, and selectively adapts the TTP table as a function of an inertia and acceleration value of the engine. The TCM may apply an asymmetrical handoff profile to commanded oncoming and offgoing clutch torques during the torque phase of the upshift. The TCM may also adjust the TTP table as a function of the frequency of use of the input clutches.

12 Claims, 4 Drawing Sheets

UPSHIFT CONTROL OF A DRY DUAL-CLUTCH TRANSMISSION

CROSS-REFERENCE TO RELATED APPLICATIONS

This application claims the benefit of U.S. Provisional Application No. 61/749,596, filed on Jan. 7, 2013, which is hereby incorporated by reference in its entirety.

TECHNICAL FIELD

The present disclosure relates to the upshift control of a dry dual-clutch transmission.

BACKGROUND

A dual-clutch transmission combines certain features of manual and automatic transmissions. In a dual-clutch transmission, a first input clutch is applied to engage any odd gear sets of a gearbox, while a second input clutch is applied to engage the even gear sets. An onboard transmission control module predicts the next gear to be selected using available control inputs such as engine acceleration and braking levels, and then commands engagement of the next gear ahead of the impending shift. Use of a dual-clutch transmission can improve the speed of a gear shift relative to those occurring in a conventional automatic transmission, typically with improved shift control and increased power.

A dual-clutch transmission may be either wet or dry. The gearbox and both input clutches of a wet dual-clutch transmission are cooled and lubricated by fluid that is circulated via an engine-driven pump and/or an auxiliary fluid pump. In a dry dual-clutch transmission or dDCT, the gearbox remains lubricated while the two input clutches remain dry. As a result, a dDCT tends to experience greater performance variation relative to a wet DCT design. Such performance variation is due largely to the wider variation in both the bulk temperature as well as the surface temperature of the non-lubricated input clutches.

SUMMARY

A vehicle is disclosed herein having an engine, a dry dual-clutch transmission (dDCT), and a transmission control module (TCM). The TCM controls a power-on upshift in a manner that compensates for the fundamental performance variation described above. This in turn improves the overall quality of the power-on upshift. To achieve such ends, the TCM enforces feed-forward, proportional-integral-derivative (PID)-based control logic over the position of a designated one of the two input clutches of the dDCT, i.e., of the particular input clutch needed to complete the commanded power-on upshift.

Additionally, the TCM may apply torque offsets during the power-on upshift to reduce a commanded clutch torque in a manner that compensates for the inertia and acceleration of the engine. During the torque phase of the requested power-on upshift, offgoing and oncoming clutch torques may be ramped in an asymmetrical manner to provide an asymmetrical torque exchange or "handoff" between the offgoing and oncoming clutches used to implement the shift. This may entail respectively ramping the offgoing or oncoming clutches later or earlier than in a conventional symmetrical torque exchange. Other control actions may be taken to further optimize the overall feel of the power-on upshift, including applying an optional clutch use density offset to a recorded torque-to-position table.

In a particular embodiment, the vehicle includes an internal combustion engine, a dDCT, and a transmission control module (TCM) or other suitable controller. The engine has an inertia value and an acceleration value. The dDCT includes a pair of input clutches and a gearbox, with the gearbox containing oddly-numbered and evenly-numbered gear sets. Engagement of a selected one of the pair of input clutches connects the engine to a member of a respective one of the oddly-numbered or evenly-numbered gear sets. The TCM and dDCT form a system as set forth herein.

The TCM, which is in communication with the input clutches, includes a torque-to-position (TTP) table and feed-forward, proportional, integral, derivative (PID) control logic. The TCM receives a requested power-on upshift of the dDCT. In response to this request, the TCM enforces a position of the selected one of the pair of input clutches via the feed-forward, PID control logic. The TCM thereafter selectively adapts the TTP table, for instance by adjusting its values upward or downward, or otherwise shaping a profile of the TTP table, during execution of the requested upshift.

The TCM may also apply an asymmetrical clutch torque exchange profile during the torque phase. The TCM may determine, over a calibrated interval, a frequency of use of each of the pair of input clutches, and thereafter adapt the TTP table as a function of the frequency of use.

A system is also disclosed herein that includes the dDCT and the TCM as described above.

Additionally, a method is disclosed that includes determining an inertia value and an acceleration value of an internal combustion engine in a vehicle having a dDCT. The method also includes recording the calibrated TTP table and feed-forward, PID-based control logic in tangible, non-transitory memory of the TCM. Additionally, the method includes determining, via the TCM, a requested power-on upshift of the dDCT, commanding a position of the designated input clutch via the feed-forward, PID control logic, and selectively adapting the TTP table during execution of the requested power-on upshift as a function of the inertia and acceleration values of the engine.

The above features and advantages, and other features and advantages of the present invention are readily apparent from the following detailed description of some of the best modes and other embodiments for carrying out the invention, as defined in the appended claims, when taken in connection with the accompanying drawings.

DETAILED DESCRIPTION

Figure 1:
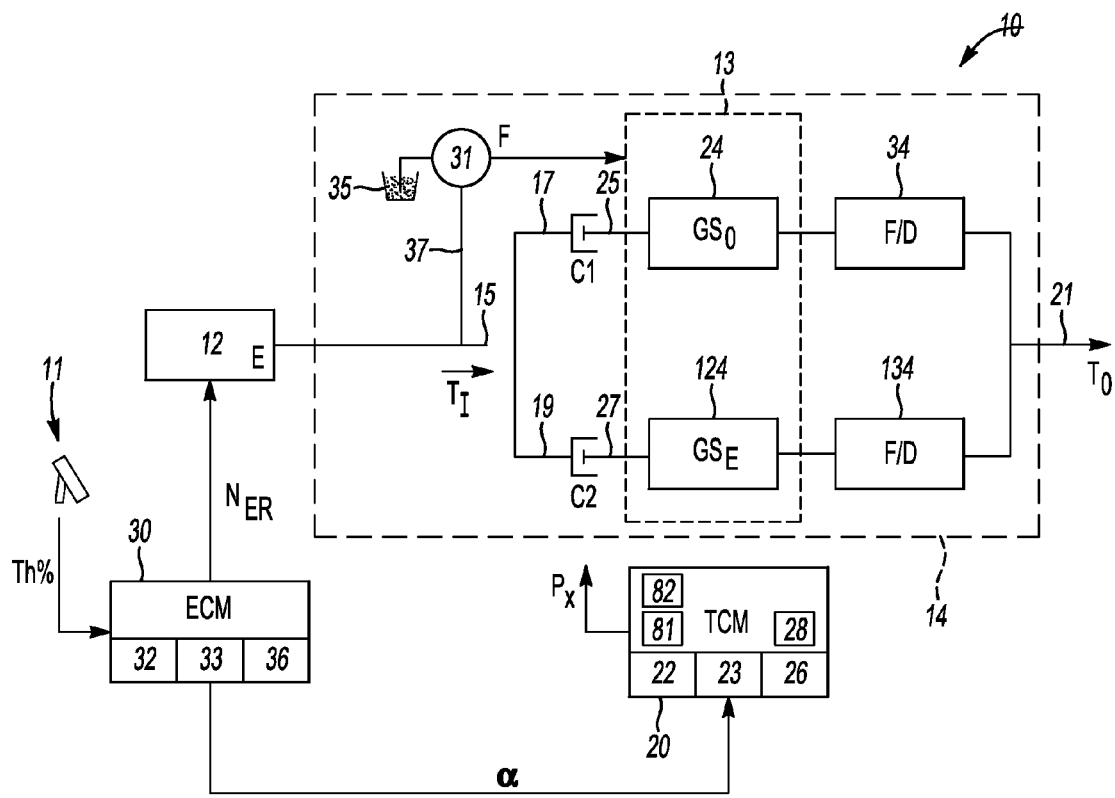
FIG. 1 is a schematic illustration of a vehicle having a dry dual-clutch transmission (dDCT) and a transmission control module (TCM) which controls a power-on upshift of the dDCT according to a feed-forward, PID-based clutch position control approach as set forth herein.

Referring to the drawings, wherein like reference numbers refer to like components throughout the several Figures, an example vehicle 10 is shown schematically in FIG. 1. The vehicle 10 includes an internal combustion engine (E) 12 and a dry dual-clutch transmission 14, which is referred to hereinafter as the dDCT 14 for simplicity. The engine 12 is responsive to a received throttle request (arrow Th %), e.g., an apply force to or a corresponding percentage of travel of an accelerator pedal 11 or other suitable throttle input device, with the throttle request (arrow Th %) requesting a relative level of engine torque. The force/travel of the accelerator pedal 11 may be detected via a force or position sensor (not shown) in the conventional manner. In response to receipt of the throttle request (arrow Th %) by an engine control module (ECM) 30, the engine 12 generates engine torque, which is delivered as an input torque (arrow $T_I$) to the dDCT 14 via a rotatable drive member 15.

As is well understood in the art, a dDCT, such as the example dDCT 14 shown in FIG. 1, is an automated, manual-like transmission having a gearbox 13 and two independently-operated, non-lubricated input clutches, i.e., the respective first and second input clutches C1 and C2. While omitted from FIG. 1 for illustrative clarity, each input clutch C1 and C2 may include a center plate containing any number of spaced friction discs, friction plates, or other suitable friction materials. The input clutches C1 and C2 are selectively compressed together via a fluid-actuated clutch piston or other suitable clutch actuator(s), with these pistons having an axial position used in the overall control of the input clutches C1 and C2. Fluid (arrow F) may be circulated to the gearbox 13 via a fluid pump 31. Associated electronic and hydraulic clutch control devices (not shown) ultimately control shift operations of the dDCT 14 in response to instructions or commands from various onboard controllers as explained in detail below.

In the example dDCT 14 of FIG. 1, the first input clutch C1 may be used to connect the engine 12 to any of the oddly-numbered gear sets 24 ($GS_O$) of the dDCT 14, for instance to establish first, third, fifth, and seventh gears in an example 7-speed transmission, while the second input clutch C2 connects the engine 12 to reverse or any of the evenly-numbered gear sets 124 ($GS_E$), e.g., second, fourth, and sixth gears in the same example 7-speed transmission. Using this type of gear arrangement, the dDCT 14 can be rapidly shifted through its available range of gears without completely interrupting the power flow from the engine 12.

Figure 2:
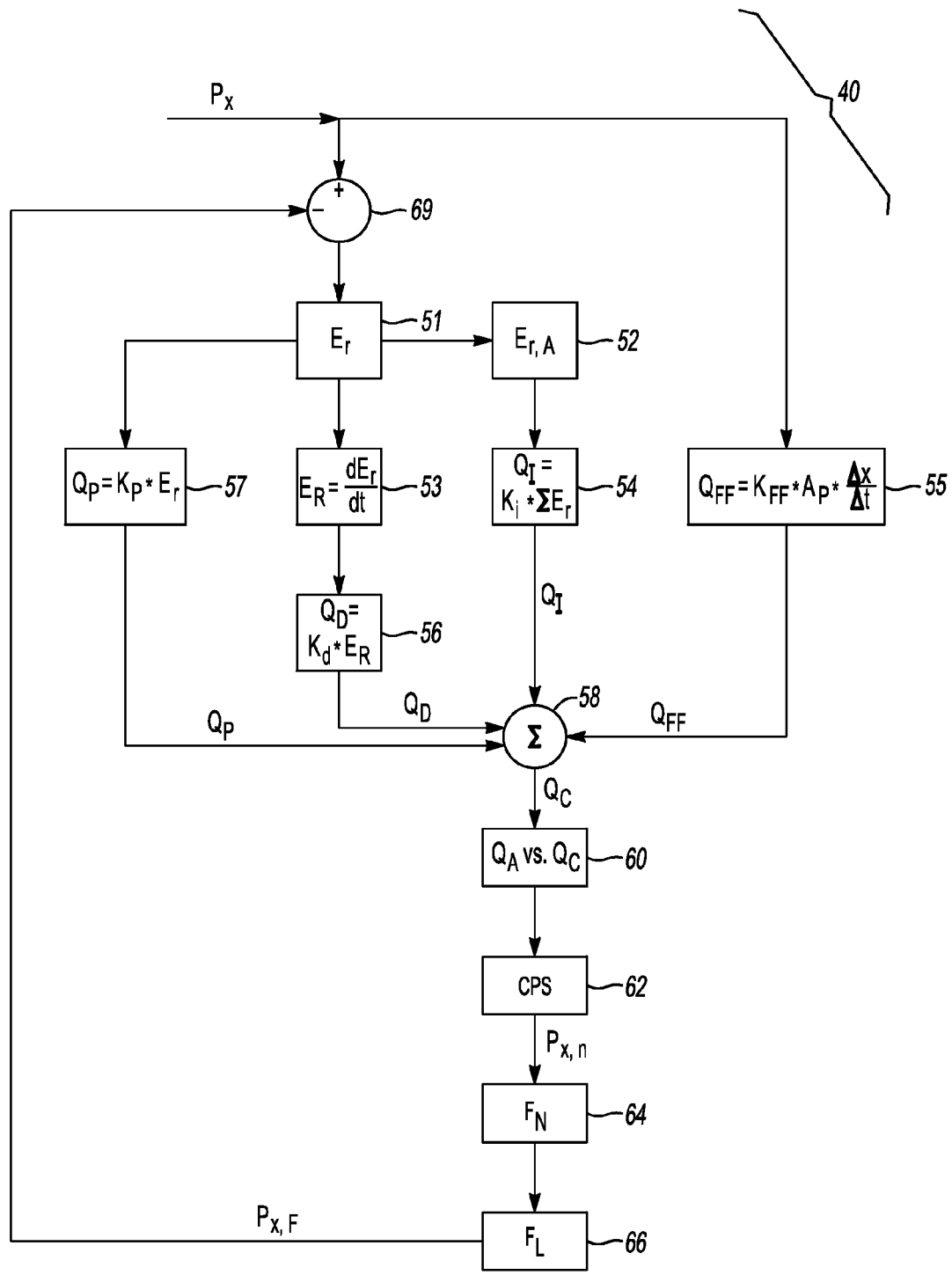
FIG. 2 is a schematic logic flow diagram for example feed-forward, PID-based clutch position control logic usable by the TCM shown in FIG. 1.

The controllers of the vehicle 10 as shown in FIG. 1 include at least a transmission control module (TCM) 20 and the ECM 30. As set forth in detail below with reference to FIGS. 2-4, the TCM 20 works in conjunction with the ECM 30 to provide feed-forward, PID-based position control over the input clutches C1 and C2, i.e., over the linear position of an apply piston or other actuator. Example logic flow for this functionality is shown in FIG. 2. Typically, the input clutch C1 of FIG. 1 would be used as the oncoming clutch for an upshift to an oddly-numbered gear, while the input clutch C2 would act as the designated input clutch, and thus the oncoming clutch, for any upshift to an evenly-numbered gear. For instance, in an example 1-2 power-on upshift of the dDCT 14, the input clutch C1 would act as the offgoing clutch while the input clutch C2 would act as the oncoming clutch. Other power-on upshifts may be similarly controlled using the approach set forth herein without departing from the intended inventive scope, e.g., a 2-3 power-on upshift wherein the input clutches C1 and C2 function as the respective oncoming and offgoing clutches.

The present shift control approach is intended to address the above-mentioned temperature-based fundamental variation of a dDCT so as to improve the overall shift quality of a power-on upshift. Such variation may occur in a dDCT due to the lack of cooling fluid at the friction interfaces of the input clutches. Feed-forward PID control is used herein to adapt a torque-to-position (TTP) table 28 that is previously recorded in memory 23 of the TCM 20. This adaptation is explained in further detail below with reference to FIG. 4.

Additionally, the present control approach is intended to help compensate for inertia of the accelerating engine 12 and the rest of the powertrain during a power-on upshift, which is described below with particular reference to FIG. 5. The TCM 20 of FIG. 1 may also enforce a calibrated, asymmetrically-shaped "torque handoff" between the offgoing and oncoming clutches of the dDCT 14 during the same power-on upshift, with this particular aspect of the control approach described below with reference to FIG. 6. Finally, as shown in FIG. 7 the TCM 20 may also apply an optional "clutch use density" function to selectively adapt or modify the TTP 28 over time to account in yet another manner for the fundamental dDCT variation described above.

In the example vehicle 10 of FIG. 1, the dDCT 14 includes an output shaft 21 that is connected to a set of drive wheels (not shown). The output shaft 21 ultimately transmits output torque (arrow $T_O$) from the dDCT 14 to the drive wheels in order to propel the vehicle 10. The dDCT 14 may include a first shaft 25 that is connected to the first input clutch C1, a second shaft 27 that is connected to the second input clutch C2, and the respective odd and even gear sets 24, 124, both of which are enclosed within the gearbox 13. Elements contained within the gearbox 13 may be cooled and lubricated via circulation of fluid (arrow F) from a sump 35 via the pump 31, e.g., via rotation of a pump shaft 37, or alternatively via battery power (not shown).

Within the dDCT 14 of FIG. 1, the first shaft 25 is connected to only the oddly-numbered gear sets 24. Likewise, the second shaft 27 is connected to only the evenly-numbered gear sets 124, including, in this embodiment, a reverse gear set. The dDCT 14 further includes upper and lower main shafts 17 and 19, respectively, which may be connected to final drive (F/D) gear sets 34, 134. The final drive gear sets 34 and 134, which are connected to the output shaft 21, provide any required final gear reduction.

The TCM 20 and the ECM 30 may be embodied as microprocessor-based computing devices having respective processors 22, 32, tangible, non-transitory memory 23, 33 including but not necessarily limited to read only memory (ROM), random access memory (RAM), electrically-erasable programmable read-only memory (EEPROM), flash memory, etc., and any required circuitry. The circuitry may include high-speed clocks, analog-to-digital (A/D) circuitry, digital-to-analog (D/A) circuitry, a digital signal processor or DSP, transceivers 26, 36 configured to transmit and receive any required signals during the overall control of the dDCT 14, and the necessary input/output (I/O) devices and other signal conditioning and/or buffer circuitry. The TCM 20 may also include a pair of counters 81 and 82, the functions of which are described in greater detail below with reference to the example method 100 shown in FIG. 7.

The TCM 20 and the ECM 30 are programmed to execute the required steps of the power-on upshift control logic disclosed herein, with the TCM 20 in particular enforcing the requisite feed-forward, PID-based position control over the designated input clutches C1 and C2 during such an upshift. As part of the present control approach, the ECM 30 may generate various control values, including an engine speed request (arrow $N_{ER}$) for control of the rotational speed of the engine 12 and an engine acceleration value (arrow), the latter of which is transmitted to the TCM 20 for use in calculating an inertia-compensated clutch torque as described below with reference to FIG. 5.

Ultimately, the TCM 20 outputs a position control signal (arrow $P_X$) to the designated input clutch C1 or C2 to thereby set the position of the designated input clutch C1 or C2 in the manner described below, and to ultimately achieve an inertia-compensated clutch torque. As used herein, the term "position control" refers to the control of the axial or linear position of a clutch apply piston or other actuator device needed for applying the input clutch C1 or C2, whichever acts as the oncoming clutch during a power-on upshift, and for releasing the other/offgoing clutch.

Referring to FIG. 2, a set of example control logic 40 for the TCM 20 of FIG. 1 is a possible embodiment for achieving the feed-forward, proportional-integral-derivative (PID) position control of the input clutch C1 or C2. Execution of recorded code embodying the control logic 40 by the processor 22 of the TCM 20 of FIG. 1 may help to overcome any temperature-related performance variation of the type described above. The feed-forward approach used herein acts by reducing this variation in real time, in part by using a feed-forward, open-loop input term that changes the required flow and pressure commanded a designated one of the input clutches C1 or C2, thus resulting in movement of the input clutch C1 or C2 to a desired position.

The TCM 20 of FIG. 1 initially transmits, in an immediately prior-executed upshift, a clutch position control signal (arrow $P_X$) to a designated input clutch of the dDCT 14 shown in the same Figure. The position control signal (arrow $P_X$) is received by a summation node 69 and a feed-forward logic block 55, with all "nodes" and "blocks" of FIG. 2 being embodied as the requisite software and hardware of the TCM 20.

The feed-forward logic block 55 in turn generates a feed-forward flow control term ($Q_{FF}$) as follows:

$$Q_{FF} = K_{FF} * A_P * \frac{\Delta x}{\Delta t}$$

where the term $K_{FF}$ is a calibrated feed-forward gain, $A_P$ is the known surface area of the clutch piston used to actuate the designated clutch, i.e., a calibrated value stored in memory 23 of the TCM 20 of FIG. 1, and $$\frac{\Delta x}{\Delta t}$$

is the calculated change in position over time of the designated input clutch C1 or C2, or rather the linear or axial position of the clutch-apply piston or other actuator used to compress the input clutch C1 or C2. The output of the feed-forward logic block 55, i.e., the feed-forward flow control term ($Q_{FF}$), is fed into another summation node 58.

The summation node 58 also receives the proportional flow control term ($Q_P$), the integral flow control term ($Q_I$), and the derivative flow control term ($Q_D$) from respective proportional (P), integral (I), and derivative (D) control logic blocks 57, 54, and 56. The proportional flow control logic block 57 may generate the proportional flow control term ($Q_P$) as follows:

$$Q_P = K_P * E_r$$

where $K_P$ is a calibrated proportional gain and Er is the calculated instantaneous position error, a value generated at the summation node 69 and recorded in an error block 51, e.g., a temporary memory location.

Similarly, the derivative flow control logic block 56 may generate the derivative flow control term as follows:

$$Q_D = K_D * E_R$$

where the term Kd is a calibrated derivative gain and $E_R$ is the error rate, a value calculated via an error rate calculation block 53, with $$E_R = \frac{dEr}{dt}.$$

With respect to the integral flow control block 54, this block may likewise generate the integral flow control term as follows:

$$Q_I = K_I * \Sigma Er$$

where $K_I$ is a calibrated integral gain and ΣEr is the accumulated position error, which may be calculated over time via an accumulated error block 52 using the instantaneous position error values (Er) provided from the error block 51 and temporarily recorded in memory.

The three PID flow control terms, i.e., $Q_P$, $Q_I$, and $Q_D$, are then added together at the summation node 58, along with the feed-forward flow control term $Q_{FF}$, to thereby calculate the commanded flow, i.e., $Q_C$. This calculated term is then compared to the actual flow rate, $Q_A$, at a comparison block 60, with any adjustments being as needed to the commanded flow.

A clutch position signal (CPS) determination block 62 then generates a new clutch position signal (arrow Px,n). This signal may be optionally filtered to reduce noise, e.g., via a notch filter ($F_N$) 64 and/or a lag filter ($F_L$) 66. The filtered clutch position signal (arrow Px,f) is then fed into the summation node 69, and the process repeats with this new position signal used for the next power-on upshift event.

Using the example control logic 40 of FIG. 2, the TCM 20 shown in FIG. 1 can automatically modify the clutch position signal (Px) for a subsequent power-on upshift by using the feed-forward term ($Q_{FF}$) in conjunction with the feedback PID flow control terms $Q_P$, $Q_I$, $Q_D$. The feed-forward term ($Q_{FF}$) predicts the required clutch flow without waiting for error to develop, while the PID control logic blocks 54, 56, 57 use temperature-based gains, i.e., $K_P$, $K_I$, and $K_D$, to optimize error correction tuning. Application of feed-forward control in this manner allows for rapid application of flow control to the designated input clutch C1 or C2, with the PID logic correcting any error which might be present in the feed-forward flow control term ($Q_{FF}$).

As a possible approach to using the example control logic 40 of FIG. 2, one may select the largest proportional gain ($K_P$) that provides a minimal amount of overshoot on large step changes in the position signal (Px), then add derivative gain ($K_D$) until the overshoot is eliminated. The integral gain ($K_I$) can be used to correct steady-state errors. Then, feed-forward control can be used by adding feed-forward gain ($K_{FF}$) until the response time improves without excessive overshoot of the position signal.

Figure 3:
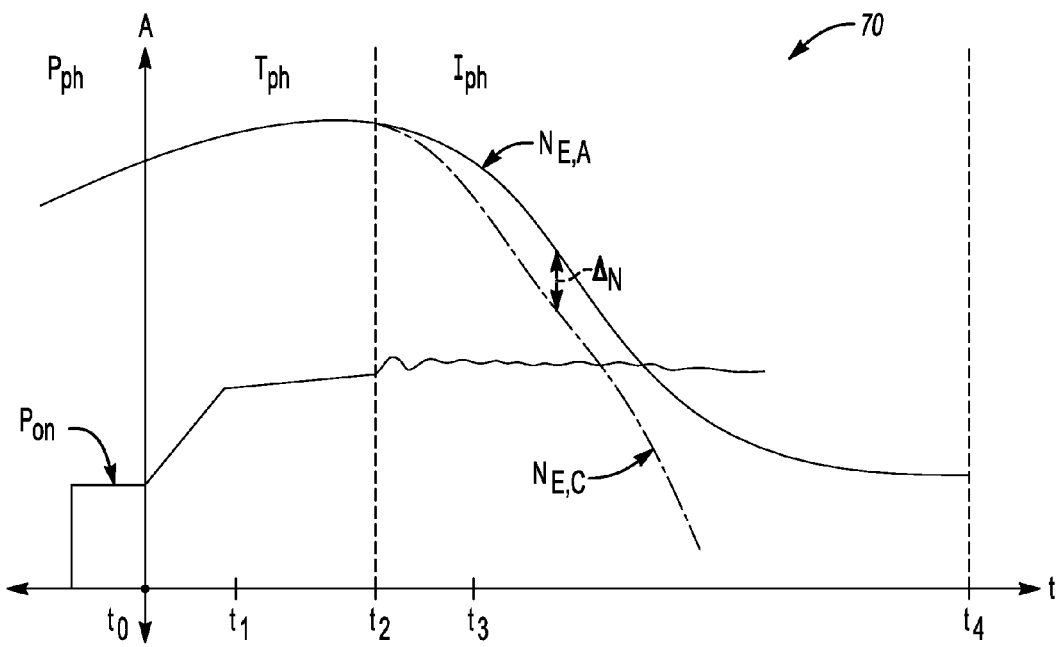
FIG. 3 is a time plot of changing engine speed and commanded clutch position for an oncoming clutch during a power-on upshift of the dDCT shown in FIG. 1, with amplitude plotted on the vertical axis and time plotted on the horizontal axis.

Referring to FIG. 3, a set of example vehicle performance traces 70 is shown. Amplitude (A) is plotted on the vertical axis and time (t) is plotted on the horizontal axis. FIG. 3 describes a typical power-on upshift event through different clutch phases. Prior to $t_0$, the TCM 20 of FIG. 1 operates in a preparation phase (Pph) during which the oncoming clutch position command (trace Pon) is automatically stepped up to a calibrated level. A driver of the vehicle 10 of FIG. 1 may command a wide-open throttle, e.g., by firmly depressing an accelerator pedal, which in turn leads to a decision by the TCM 20 to execute the power-on upshift.

The torque phase (Tph) of the power-on upshift is entered at $t_0$ and continues until $t_2$. As is known in the art, in the torque phase of a shift, the transmitted clutch torque changes without a corresponding significant change in clutch rotational speed. During the torque phase, the TCM 20 of FIG. 1 may ramp the oncoming clutch position command (trace Pon) at a calibrated rate to a predetermined level, which is reached in FIG. 3 at about $t_1$, and then holds at or near this level until completion of the torque phase (Tph), after which inertia-compensated position control is enforced by the TCM 20. An example of possible inertia compensation is described in more detail below with reference to FIG. 5. Proper offgoing and oncoming torque phase control in the dDCT 14 of FIG. 1 requires smooth release of the offgoing clutch, e.g., input clutch C1, while the oncoming clutch, e.g., input clutch C2, reaches capacity. Oncoming clutch position (trace Pon) may be ramped in multiple stages as shown, while the same or more ramps may be applied to the offgoing clutch (not shown) during the same torque phase (Tph). Such an approach may allow for variation in the clutch torque-to-position relationship.

At the beginning of the inertia phase (Iph) of the upshift, commencing at $t_2$ in FIG. 3, i.e., a phase in which the input rotational speed to the input clutch C1 or C2 varies mainly due to an inertia change along the driveline, the TCM 20 can monitor error between a commanded engine speed profile (trace $N_{E,C}$) and an actual engine speed profile (trace $N_{E,A}$). That is, the TCM 20 can calculate this speed difference ($\Delta N$) and apply it in the overall control of the oncoming clutch during the commanded upshift.

Figure 4:
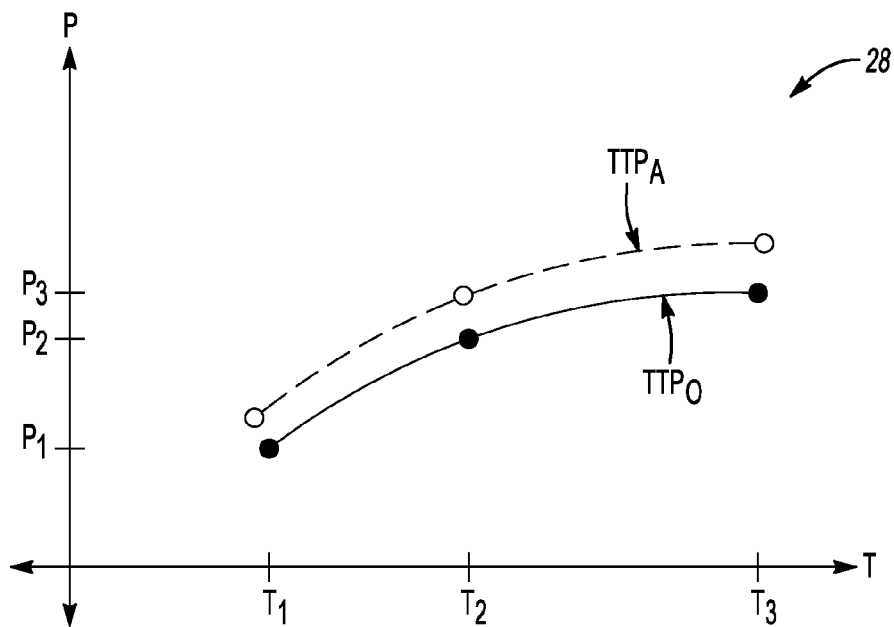
FIG. 4 is a schematic illustration of an example torque-to-position (TTP) table which may be used and adapted during the control of the dDCT shown in FIG. 1, with position plotted on the vertical axis and torque plotted on the horizontal axis.

Referring to FIG. 4, during the execution of the commanded power-on upshift as described in FIG. 3, the TCM 20 of FIG. 1 can automatically update the TPP table 28, e.g., a three-position TTP model as shown. In an example embodiment, the TTP table 28 may be modified once per upshift by a small calibrated amount, e.g., 1-2 mm of clutch position (P) for the same amount of clutch torque (T). FIG. 4 illustrates such an adjustment, with the original TTP table 28 ($TTP_O$) being automatically upwardly adjusted to form a new, adjusted TTP table ($TTP_A$). The adjusted TTP table is then recorded in memory 23 of the TCM 20 for use in controlling the position of the oncoming clutch C1 or C2 during the next power-on upshift.

Figure 5:
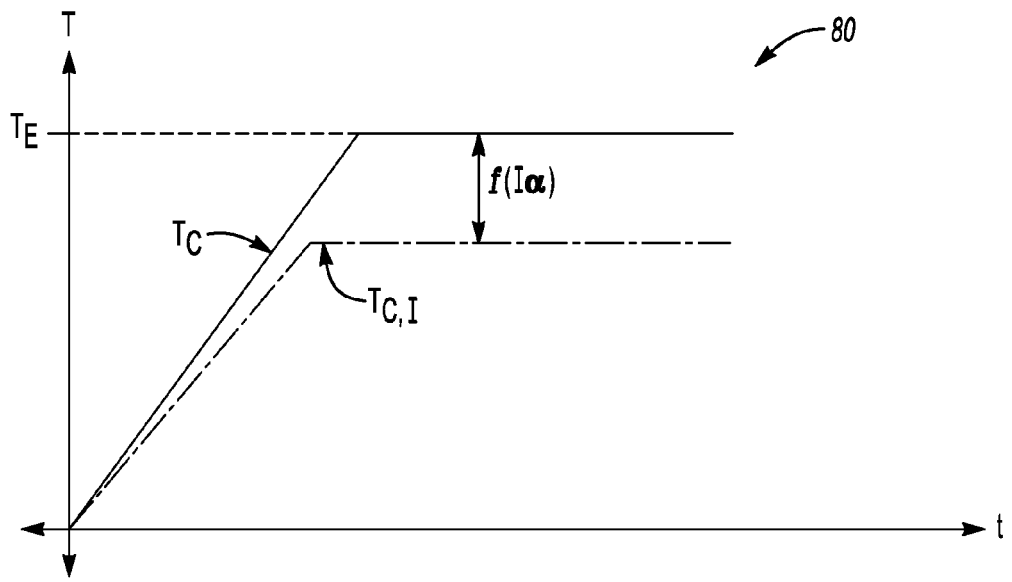
FIG. 5 is a schematic time plot of the changing amplitude of an engine torque, commanded clutch torque, and an inertia-compensated clutch torque, with amplitude plotted on the vertical axis and time plotted on the horizontal axis.

Referring to traces 80 of FIG. 5, as part of the present approach the TCM 20 of FIG. 1 may automatically correct offgoing clutch torque by compensating for the known inertia of the engine 12 and possibly other drivetrain components. The dDCT 14 of FIG. 1, as with any dDCT, will typically experience a relatively large inertia flywheel effect from the accelerating engine 12, such that if the ECM 30 indicates an available input torque from the engine 12 of, for instance, 200 Nm, the accelerating engine 12 may actually deliver only 100 Nm into the dDCT 14. The remainder of the engine torque is required to overcome the substantial amount of engine inertia. Thus, the TCM 20 may use the known inertia (I) and the acceleration value ($\alpha$) of the engine 12 to calculate an inertia-compensated clutch torque (trace $T_{C,I}$), such that the difference between the engine torque ($T_E$) and the inertia-compensated clutch torque (trace $T_{C,I}$) is determined as a function of the inertia I and the acceleration value ($\alpha$), i.e., f(I, $\alpha$).

This inertia-compensated torque is something less than the engine's actual output torque (trace $T_E$). Absent use of the inertia-compensated torque, the commanded clutch torque (trace $T_C$) would approach engine torque as shown, which could result in a relatively harsh upshift. As part of this approach, the TCM 20 of FIG. 1 may apply a calibrated constant or lag filter coefficient such that something less than 100% of the inertia-compensated torque is not applied, e.g., 85-90% of this value in one embodiment. Thus, the "function" noted above may include applying a filter, constant, scale factor, or other gain value, which may be determined offline for the particular vehicle 10 and dDCT 14 being used.

Figure 6:
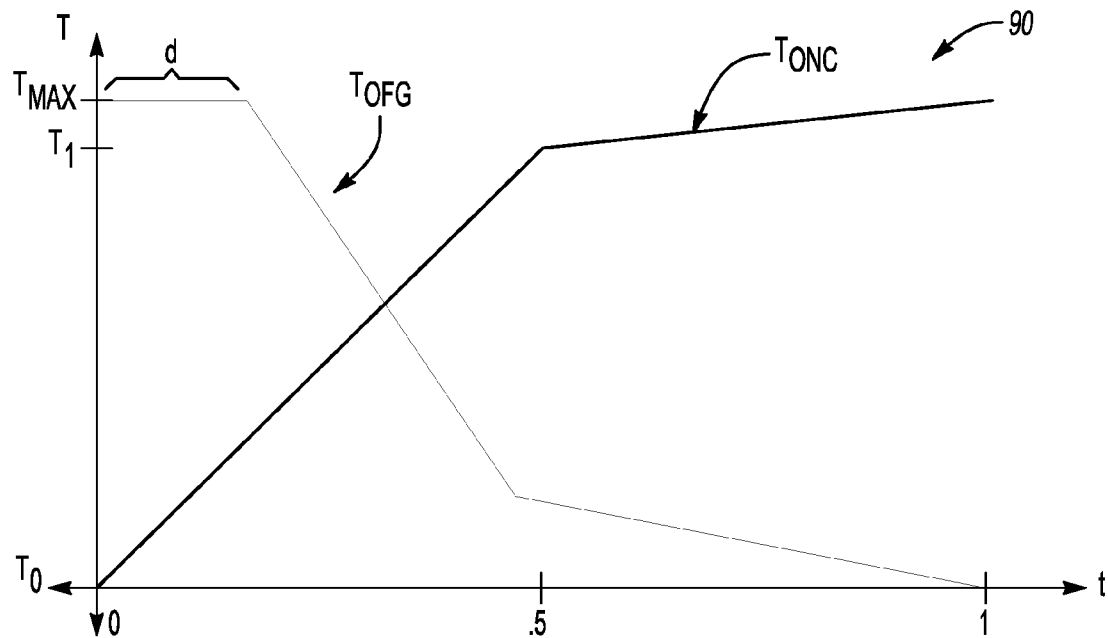
FIG. 6 is a schematic time plot of a normalized, asymmetric torque handoff profile usable during an upshift of the example dDCT shown in FIG. 1, with normalized amplitude plotted on the vertical axis and normalized time plotted on the horizontal axis.
Figure 7:
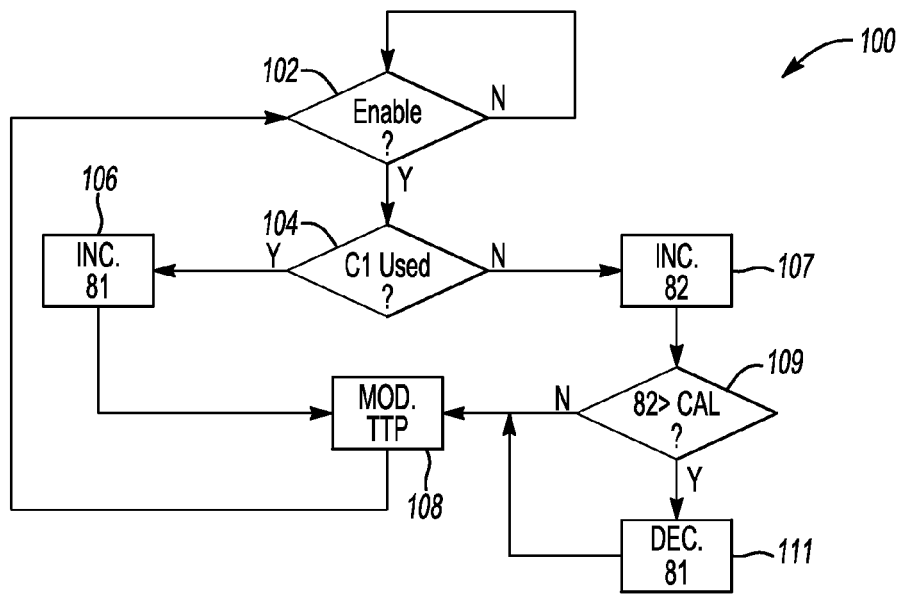
FIG. 7 is a flow chart describing an example method for adapting a recorded TTP table for use with the dDCT of FIG. 1 using an optional clutch use density function.

Referring to FIG. 6, closed-loop control is conventionally instituted on the input to a TTP table, such that a circular dependency can result which may vary the result of how effective closed-loop control will be on a shift-to-shift basis. To address this problem, the handoff of torque between the offgoing and oncoming clutch is made in the present approach in a non-linear and disproportionate manner, i.e., asymmetrically, rather than in the equal-and-opposite/symmetrical manner of an "ideal" torque handoff. As is known in the art, an ideal or symmetrical torque handoff is one in which the offgoing clutch torque ramps down during the torque phase of an upshift shift at exactly the same rate that an oncoming clutch torque rises, such that the moment in time at which the offgoing capacity reaches zero coincides, within a small control margin, with the moment at which the oncoming capacity reaches its target value. For instance, the target value may be input torque from the engine minus the inertia component plus any calibrated modifiers. As the underlying position of each input clutch is not perfectly controlled in a dDCT, it is recognized herein that torque flare can result using the conventional ideal handoff profile.

Therefore, the present invention may help to overcome fundamental variation in the dDCT 14 shown in FIG. 1 in yet another way: by ensuring that the oncoming clutch has enough torque capacity. That is, the TCM 20 ensures that the oncoming clutch has more capacity than the offgoing clutch, thereby eliminating engine flare. The TCM 20 of FIG. 1 may delay reduction of the offgoing torque for an interval or duration (d) at the start of the torque phase. The TCM 20 may also increase oncoming clutch relatively early and decrease torque capacity of the ongoing clutch relatively late with respect to the "equal and opposite" synchronized timing provided by an ideal torque handoff. This is shown schematically via the set of traces 90 of FIG. 6.

In the example of FIG. 6, offgoing clutch torque is represented by trace $T_{OFG}$ and the oncoming clutch torque is represented by trace $T_{ONC}$. Normalized time (t), i.e., a nominal interval of 0 to 1, is plotted on the horizontal axis. The particular shape of the torque handoff may be tailored to the particular dDCT, and thus may be a calibrated value. The value $T_{MAX}$ as plotted on the vertical axis corresponds to a fully-loaded input clutch C1 or C2. The value $T_0$ corresponds to a fully-released input clutch. The handoff is complete at t=1. All values in FIG. 6 are normalized, and thus the actual underlying values will vary with the design of the dDCT 14 of FIG. 1, e.g., with t=1 representing the maximum time to complete the shift.

In FIG. 6, an example profile of (0.5, 0.9) is used for the oncoming clutch such that trace $T_{ONC}$ reaches about 90% of its target clutch torque, or $T_1$, halfway through the upshift, i.e., at t=0.5. After the delay (d), the offgoing clutch is released quickly, e.g., using a profile (0.8, 0.2), wherein 80% of the clutch torque is released just 20% of the way through the shift. The remainder of the shift may see the remaining 20% of offgoing clutch torque ramped to zero at a linear rate, reaching zero at t=1 when the handoff is complete. Other profiles may be used for the offgoing and oncoming clutches without departing from the intended inventive scope.

As noted above, a dDCT, while providing many performance advantages, is nevertheless prone to a potentially large performance variation due largely to the wide temperature variation, both in bulk temperature as well as in surface temperature. The present approach, which is described in more detail with reference to FIG. 7, attempts to compensate for this tendency by calculating the usage of the clutch and then offsetting the position of that clutch based on the amount of times the clutch has been "used".

An example method 100 for doing this begins with step 102 of FIG. 7, wherein predetermined enable conditions are evaluated by the TCM 20 of FIG. 1 to determine if further execution of the method 100 is warranted. Enabling conditions may include, by way of example, an engine-on status, a drive state of the dDCT 14, etc. The method 100 proceeds to step 104 when these enable conditions have been satisfied.

At step 104, the TCM 20 next determines whether a particular input clutch C1 or C2 has been used, i.e., fully engaged, in the most-recently completed power-on upshift of the dDCT 14 shown in FIG. 1. If so, the method 100 proceeds to step 106. The method 100 otherwise proceeds to step 107.

At step 106, the TCM 20 increments the counter 81 shown in FIG. 1. The counter 81 in this instance acts as a "clutch use" counter, and thus counts up or increments by a value of one for each successive engagement or application of a given one of the input clutches C1 and C2. Within the TCM 20, the counter 81 may be optionally embodied as two separate counters, with one tracking the use of input clutch C1 and another tracking use of the input clutch C2. The method 100 proceeds to step 108 once the counter 81 has been incremented.

At step 107, if a given input clutch C1 or C2 has not been used in the preceding upshift, the TCM 20 of FIG. 1 may increment the counter 82 shown in the same Figure, i.e., a "clutch inactive" timer. The method 100 then proceeds to step 109.

At step 108, the TCM 20 next applies an offset to the TTP table 28 of FIGS. 1 and 4, doing so as a function of the present value of the counter 81. That is, if a given input clutch C1 or C2 is used relatively frequently over a short calibrated interval, the TTP table 28 of FIG. 4 may be automatically modified via the TCM 20 so as to compensate for the increase in bulk and surface temperature that is likely to have resulted. Modification of the TTP table 28 may be in the manner that is shown in FIG. 4, i.e., by adjusting the TTP table 28 upward by a fixed amount, or alternatively adjusting the TTP table 28 downward, and/or by shaping the curve of the TTP table 28 differently than as shown, so as to properly account for the temperature effects of excess clutch use. The method 100 may then return to step 102.

Step 109 may include comparing the count value of the counter 81 to a calibrated threshold. If the count value of the counter 81 exceeds this threshold, which would mean that the corresponding input clutch C1 or C2 has been inactive for an extended period of time, the method 100 proceeds to step 111. Otherwise, the method 100 proceeds directly to step 108.

Step 111 may include decrementing the counter 81, i.e., decreasing its count value by 1. Once this has been accomplished, the method 100 proceeds to step 108.

Using the approach set forth in FIGS. 2-7 above, the speed of existing closed-loop clutch position controls in a dDCT can be improved. This is largely due to the enhanced ability of the presently disclosed method to closely match commanded and actual flow rates to an input clutch in a dDCT, a capability lacking in the closed-loop, feedback-based conventional approaches. The feed-forward term shown in FIG. 2 helps to predict the commanded flow needed for a given actual flow, without waiting for error to develop. The temperature-based gains used in the control logic 40 of FIG. 2 allow for proper error correction tuning, with the TTP table 28 shown in FIG. 4 adapted over time to optimize shift quality in the dDCT 14.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
   an internal combustion engine having an inertia value and an acceleration value;
   a dry dual-clutch transmission (dDCT) having a pair of non-lubricated input clutches and a lubricated gearbox that contains separate oddly-numbered and evenly-numbered gear sets, wherein an application of a designated one of the input clutches connects the engine to a corresponding one of the oddly-numbered or evenly-numbered gear sets; and
   a transmission control module (TCM) in communication with the pair of input clutches, wherein the TCM includes a processor and tangible, non-transitory memory on which is recorded a calibrated torque-to-position (TTP) table and feed-forward, proportional, integral, derivative (PID)-based control logic, and wherein the TCM is configured to:
   detect a requested power-on upshift of the dDCT;
   command a position of the designated input clutch via the feed-forward, PID-based control logic;
   execute the requested power-on upshift;
   selectively adapt the calibrated TTP table during the execution of the requested power-on upshift as a function of the inertia value and the acceleration value of the engine; and
   determine, over a calibrated interval, a frequency of use of each of the pair of non-lubricated input clutches, and to thereafter adapt the TTP table as a function of the frequency of use.

2. The vehicle of claim 1, wherein the detected power-on upshift has a torque phase, and wherein the TCM is configured to delay, at the start of the torque phase, a reduction in offgoing torque capacity of the other of the pair of input clutches to the designated input clutch before applying an asymmetrical clutch torque exchange profile that changes the offgoing and oncoming torque capacities in a non-linear and disproportionate manner with respect to each other.

3. The vehicle of claim 1, wherein each of the input clutches is applied via a corresponding clutch piston having an axial position, and wherein the feed-forward, PID-based control logic provides open-loop and closed-loop control over the axial position of the corresponding clutch piston for the designated input clutch.

4. The vehicle of claim 3, wherein the feed-forward, PID-based control logic introduces a feed-forward flow control term that includes a surface area of the clutch piston for the designated input clutch.

5. A system comprising:
a dry dual-clutch transmission (dDCT) that is connectable to an internal combustion engine and that includes:
a pair of non-lubricated input clutches;
a lubricated gearbox containing oddly-numbered and evenly-numbered gear sets; and
a pair of clutch pistons, wherein engagement of a designated one of the pair of input clutches by a corresponding one of the pair of clutch pistons connects the engine to a designated one of the oddly-numbered or evenly-numbered gear sets; and
a transmission control module (TCM) in communication with the pair of input clutches, wherein the TCM includes a processor and tangible, non-transitory memory on which is recorded a calibrated torque-to-position (TTP) table and feed-forward, proportional, integral, derivative (PID)-based control logic, and wherein the TCM is configured to:
detect a requested power-on upshift of the dDCT;
command a position of the designated input clutch via the feed-forward, PID-based control logic;
execute the requested power-on upshift;
selectively adapt the calibrated TTP table during the execution of the requested power-on upshift as a function of the inertia value and the acceleration value of the engine; and
determine, over a calibrated interval, a frequency of use of each of the pair of non-lubricated input clutches, and to thereafter adapt the TTP table as a function of the frequency of use.

6. The system of claim 5, wherein the detected power-on upshift has a torque phase, and wherein the TCM is configured to delay, at the start of the torque phase, a reduction in offgoing torque capacity of the other of the pair of input clutches to the designated input clutch before applying an asymmetrical clutch torque exchange profile that changes the offgoing and oncoming torque capacities in a non-linear and disproportionate manner with respect to each other.

7. The system of claim 5, wherein each of the clutch pistons has an axial position, and wherein the feed-forward, PID-based control logic provides open-loop and closed-loop control over the axial position of the corresponding clutch piston for the designated input clutch.

8. The system of claim 5, wherein the feed-forward, PID-based control logic introduces a feed-forward flow control term that includes a surface area of the clutch piston for the designated input clutch.

9. A method comprising:
determining an inertia value and an acceleration value of an internal combustion engine in a vehicle having the engine and a dry dual-clutch transmission (dDCT) having a pair of non-lubricated input clutches;
recording a calibrated torque-to-position (TTP) table and feed-forward, proportional, integral, derivative (PID)-based control logic in tangible, non-transitory memory of a transmission control module (TCM);
detecting, via the TCM, a requested power-on upshift of the dDCT;
commanding a position of the designated input clutch via the feed-forward, PID-based control logic;
selectively adapting the TTP table during execution of the requested power-on upshift as a function of the inertia value and the acceleration value of the engine;
determining, over a calibrated interval, a frequency of use of each of the pair of non-lubricated input clutches; and
adapting the calibrated TTP table as a function of the frequency of use.

10. The method of claim 9, further comprising: delaying, at the start of the torque phase, a reduction in offgoing torque capacity of the other of the pair of input clutches to the designated input clutch; and
applying an asymmetrical clutch torque exchange profile describing an exchange of torque between the pair of input clutches that changes the offgoing and oncoming torque capacities in a non-linear and disproportionate manner with respect to each other.

11. The method of claim 9, wherein each of the input clutches is applied via a corresponding clutch piston having an axial position, the method further comprising:
providing, via the feed-forward, PID-based control logic, both open-loop and closed-loop control over the axial position of the corresponding clutch piston for the designated input clutch.

12. The method of claim 11, further comprising: introducing a feed-forward flow control term, via the feed-forward, PID-based control logic, that includes a surface area of the clutch piston for the designated input clutch.

* * * * *